United States Patent
Dittmer et al.

(10) Patent No.: US 7,284,910 B2
(45) Date of Patent: Oct. 23, 2007

(54) CAPILLARY SEAL WITH FLOW RESTRICTORS

(76) Inventors: Daniel Dennis Dittmer, 708 Seabright Ave., #A, Santa Cruz, CA (US) 95062; Robert Michael Pelstring, 127 De La Costa Ave., Santa Cruz, CA (US) 95060; Anthony J. Aiella, 521 Encino Dr., Aptos, CA (US) 95003; Lynn Bich-Ouy Le, 1521 Calle De Stuarda, San Jose, CA (US) 95118; Hans L. Leuthold, 1238 Escalona Dr., Santa Cruz, CA (US) 95060; Alan Lyndon Grantz, 7330 Viewpoint Rd., Aptos, CA (US) 95003

( * ) Notice: Subject to any disclaimer, the term of this patent is extended or adjusted under 35 U.S.C. 154(b) by 248 days.

(21) Appl. No.: 10/860,941

(22) Filed: Jun. 3, 2004

(65) Prior Publication Data

US 2004/0247213 A1    Dec. 9, 2004

Related U.S. Application Data

(60) Provisional application No. 60/475,835, filed on Jun. 3, 2003.

(51) Int. Cl.
  *F16C 7/00*   (2006.01)
  *F16C 32/06*  (2006.01)

(52) U.S. Cl. .................. 384/132; 384/130; 384/119

(58) Field of Classification Search ............ 384/132, 384/130, 124, 119, 100, 107; 277/411, 427, 277/424
See application file for complete search history.

(56) References Cited

U.S. PATENT DOCUMENTS

| | | | |
|---|---|---|---|
| 5,558,445 A * | 9/1996 | Chen et al. ............... | 384/132 |
| 6,010,246 A * | 1/2000 | Gomyo et al. ........... | 384/115 |
| 6,828,709 B2 | 12/2004 | Grantz et al. | |
| 2003/0190100 A1 | 10/2003 | Grantz et al. | |
| 2004/0091188 A1* | 5/2004 | Aiello et al. ............. | 384/119 |
| 2004/0208404 A1* | 10/2004 | Dittmer et al. .......... | 384/107 |
| 2004/0223673 A1* | 11/2004 | Tiller et al. ............. | 384/107 |
| 2005/0286820 A1 | 12/2005 | Grantz et al. | |
| 2006/0023982 A1 | 2/2006 | Uenosono et al. | |

* cited by examiner

*Primary Examiner*—Thomas R. Hannon
*Assistant Examiner*—Justin Krause
(74) *Attorney, Agent, or Firm*—Stephen C. Durant; Novak Druce & Quigg LLP (57) ABSTRACT

A disk drive motor having a capillary bearing seal is provided. In one embodiment, a disk drive motor includes a stationary assembly and a rotating assembly having a fluid dynamic journal bearing disposed therebetween. A capillary seal is defined proximate an upper end of the journal bearing and coupled to at least one re-circulation path. The capillary seal is configured to advantageously retain lubricating fluids within the motor when the motor is subjected to lateral shock.

27 Claims, 7 Drawing Sheets

CAPILLARY SEAL WITH FLOW RESTRICTORS

CROSS REFERENCE TO RELATED APPLICATIONS

This application claims benefit from U.S. Provisional Application No. 60/475,835, filed on Jun. 3, 2003, both of which are hereby incorporated by reference in their entireties.

FIELD OF THE INVENTION

The invention generally relates to fluid dynamic bearings and, more particularly, to fluid dynamic bearings and capillary seals designed to prevent fluid loss.

BACKGROUND OF THE INVENTION

Disk drives are capable of storing large amounts of digital data in a relatively small area. Disk drives store information on one or more recording media, which conventionally take the form of circular storage disks having a plurality of concentric circular recording tracks. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with stator windings on the base plate to rotate the hub relative to the shaft. In order to facilitate rotation, one or more bearings are usually disposed between the hub and the shaft.

The bearing assembly that enables the rotation of the storage disk is of critical importance. One bearing design is a fluid dynamic bearing. In a fluid dynamic bearing, a lubricating fluid, such as air or liquid, provides a bearing surface between a fixed member of the housing (e.g., a shaft) and a rotating member of the disk hub. In addition to air, typical lubricants include gas, oil, or other fluids. Fluid dynamic bearings spread the bearing surface over a large surface area, as opposed to a ball bearing assembly, which comprises a series of point interfaces. The large bearing surface distribution advantageously reduces wobble or run-out between the rotating and fixed members. Further, the use of fluid in the interface area imparts damping effects to the bearing, which helps to reduce non-repeatable run-out. Thus, fluid dynamic bearings are an advantageous bearing system.

Many current fluid dynamic bearing motors use capillary seals because they are capable of holding a large volume of reserve oil for increased evaporation life. However, this design is susceptible to oil leaking when subjected to shock acceleration. This loss of lubricating fluid reduces motor life and contributes to drive contamination issues, and ultimately motor failure.

Therefore, a need exists for a capillary seal design that reduces oil leakage or spillage with shock.

SUMMARY OF THE INVENTION

A disk drive motor having a capillary bearing seal is provided. In one embodiment, a disk drive motor includes a stationary assembly and a rotating assembly having a fluid dynamic journal bearing disposed therebetween. A capillary seal is defined proximate an upper end of the journal bearing. The capillary seal is configured to advantageously retain lubricating fluids within the motor when the motor is subjected to shock.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
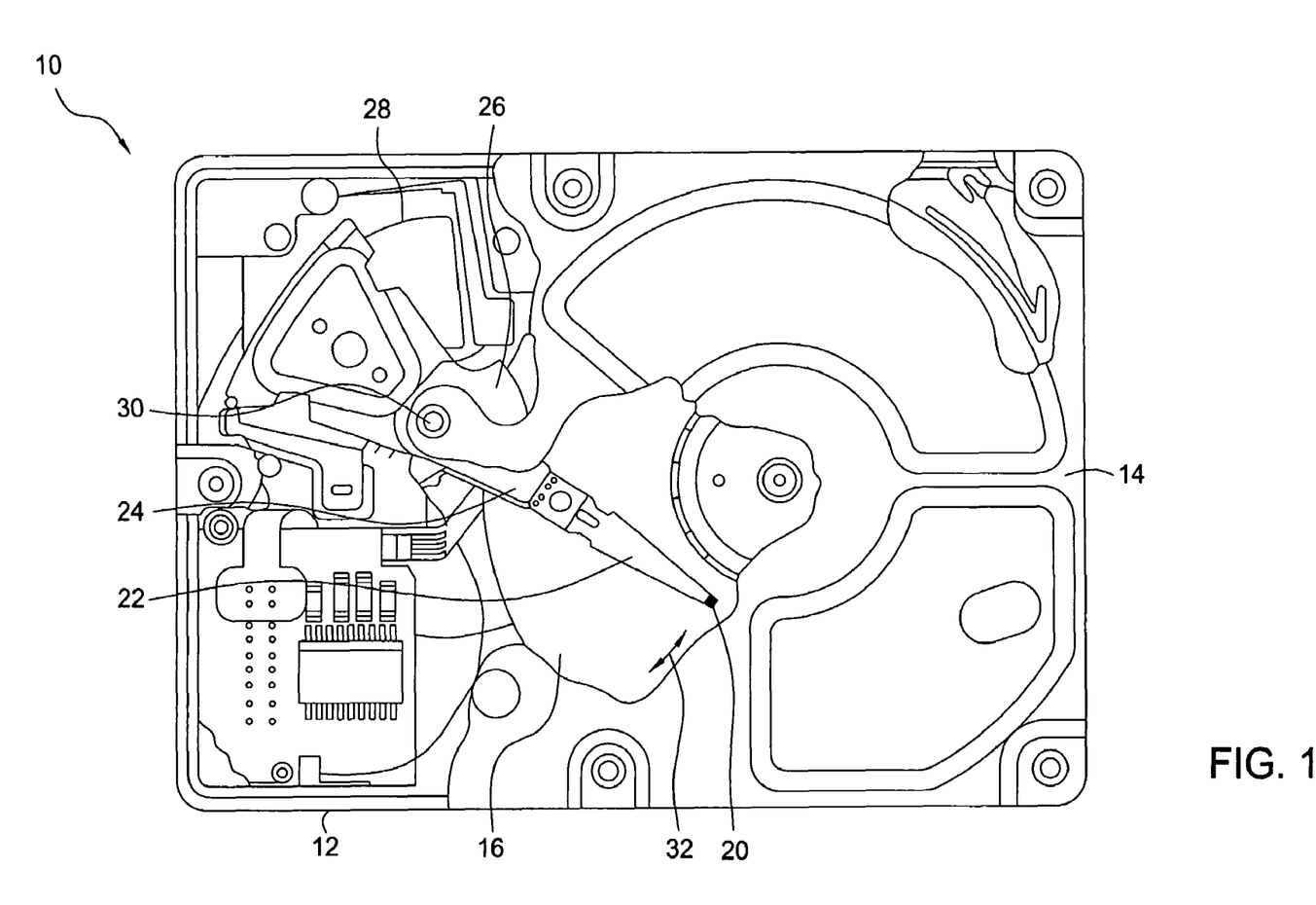
FIG. 1 depicts a plan view of one embodiment of a disk drive that comprises a motor in which the invention is used.

FIG. 1 depicts a plan view of one embodiment of a disk drive 10 having lubricating fluid retention aspects of the present invention. The disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing.

Disk drive 10 further includes a disk pack 16 having one or more of individual disks that are mounted for co-rotation about a central axis. Each disk surface has an associated read/write head 20 that is mounted to the disk drive 10 for communicating with the disk surface. In the embodiment depicted in FIG. 1, read/write heads 20 are supported by flexures 22 that are in turn attached to head mounting arms 24 of an actuator 26. The actuator 26 may be of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
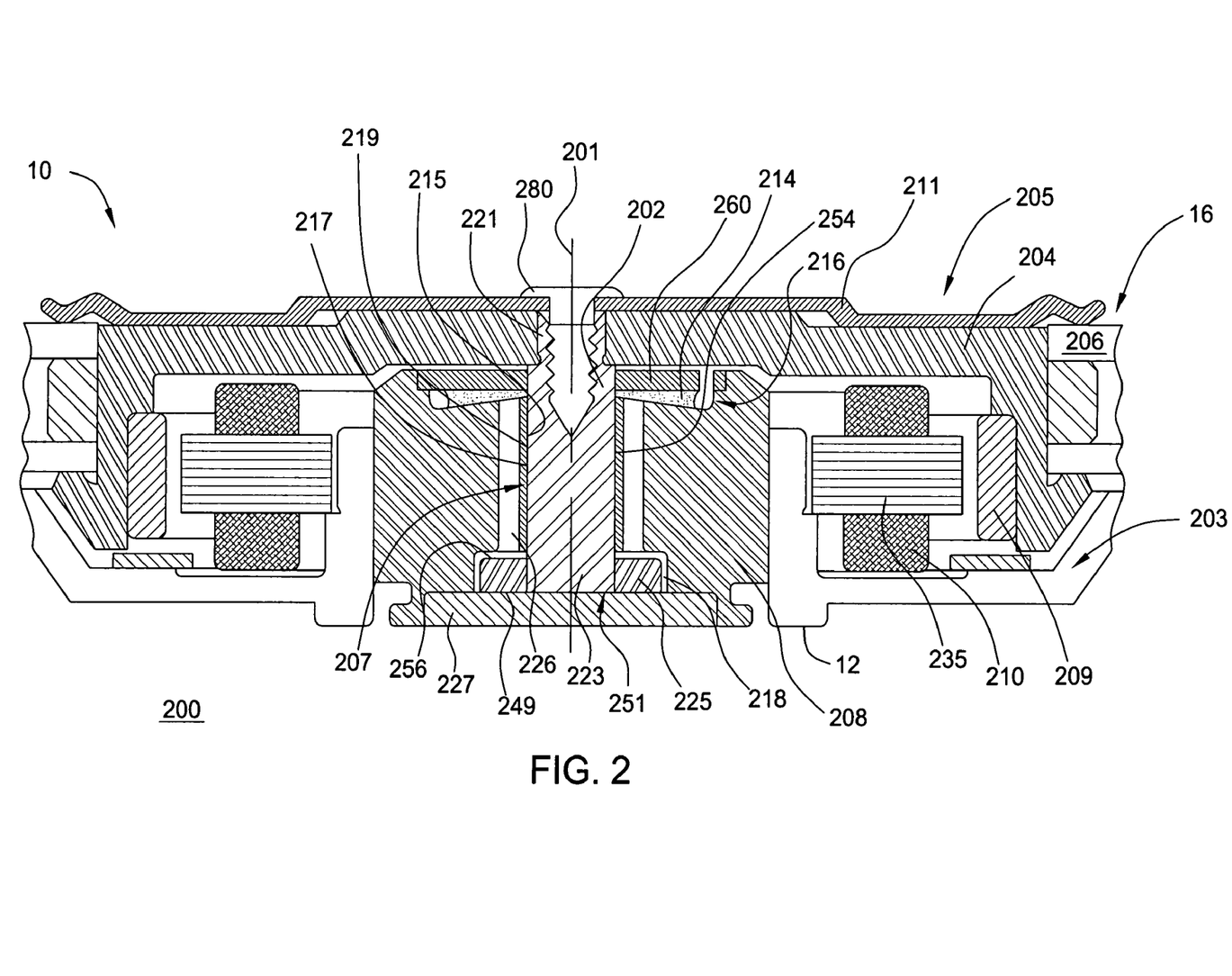
FIG. 2 depicts a partial cross-sectional view of a fluid dynamic bearing motor utilizing one embodiment of a capillary seal according to the present invention.

FIG. 2 is a sectional side view of the disk drive 10. The disk drive 10 includes a fluid dynamic bearing motor 200 utilized to rotate the disk pack 16. The motor 200 has a fluid dynamic bearing 207 disposed between a stationary assembly 203 and a rotating assembly 205.

The stationary assembly 203 has a stationary sleeve 208 coupled to the base 12. The sleeve 208 defines an inner wall 215 that provides one boundary of a journal 217 of the fluid dynamic bearing 207. A counter plate 227 is coupled to the lower end of the sleeve 208 and forms a portion of a thrust bearing 251 of the fluid dynamic bearing 207.

The rotating assembly 205 includes a hub 204 fixed to a first end 221 of a shaft 202. The hub 204 supports the disk pack 16 for rotation. The disk pack 16 includes at least one media storage disk 206 and may be coupled to the hub 204 by a disk clamp 211 fastened to the rotating assembly 205 by a screw 280 threaded into the first end 221 of the shaft 202 or by other fastening methods.

An annular thrust plate 225 is coupled onto a second end 223 of the shaft 202 by, for example, press fitting or forming, or integral therewith. An annular plenum 218 may be defined between the thrust plate 225 and the sleeve 208 and provides a space to accommodate thermal expansion of lubricants within the fluid dynamic bearing 207.

A stator assembly 210 is mounted between the rotating and stationary assemblies 205, 203. Windings and lamination, collectively indicated as 235, are coupled to the base 12 and cooperate with a plurality of magnet poles of a permanent magnet 209 coupled to the hub 204 to induce rotation of the hub 204 relative to the sleeve 208.

The fluid dynamic bearing 207 includes the journal 217 and thrust bearing 251. The journal 217 is defined between the facing surfaces of the inner wall 215 of the sleeve 208 and an outer wall 219 of the shaft 202. A lubricating fluid 214, such as oil or other lubricating fluid, is disposed between the shaft 202 and the sleeve 208. Pumping grooves 254, of a type known in this technology, are formed on at least one of the interfacial surfaces 215, 219 to pressurize and circulate the lubricating fluid 214 within the journal 217. In addition, pumping grooves 249 may be formed on at least one of the thrust plate 225 or the counter plate 227 to pressure the thrust bearing 251.

As the hub 204 is rotated by the stator assembly 210, the fluid 214 is pumped by the pumping grooves 254 toward the plenum 218 and thrust plate 225. The pumping grooves 249, which in one embodiment form an inward-pumping spiral pattern, typically pump the fluid 214 towards the center of the thrust plate 225. The plenum 218 connects the journal 217 to one or more fluid recirculation paths 226 defined through the sleeve 208. The fluid recirculation paths 226 return the fluid 214 to a capillary seal 216 positioned at the top of the journal 217. The capillary seal 216 advantageously retains lubricating fluids under shock as further discussed below.

Pressure gradients in the fluid 214 (where the fluid is a liquid) force air bubbles to flow through the recirculation path 226 and into the capillary seal 216. The capillary seal 216 provides a fluid reservoir and filling access for the fluid dynamic bearing 207 and provides a vent allowing air to escape the bearing. As the flow resistance of the recirculation path 226 is significantly lower than that of the journal 217, most of the pressure drop of the fluid dynamic bearing 207 occurs across the journal 217.

Figure 3:
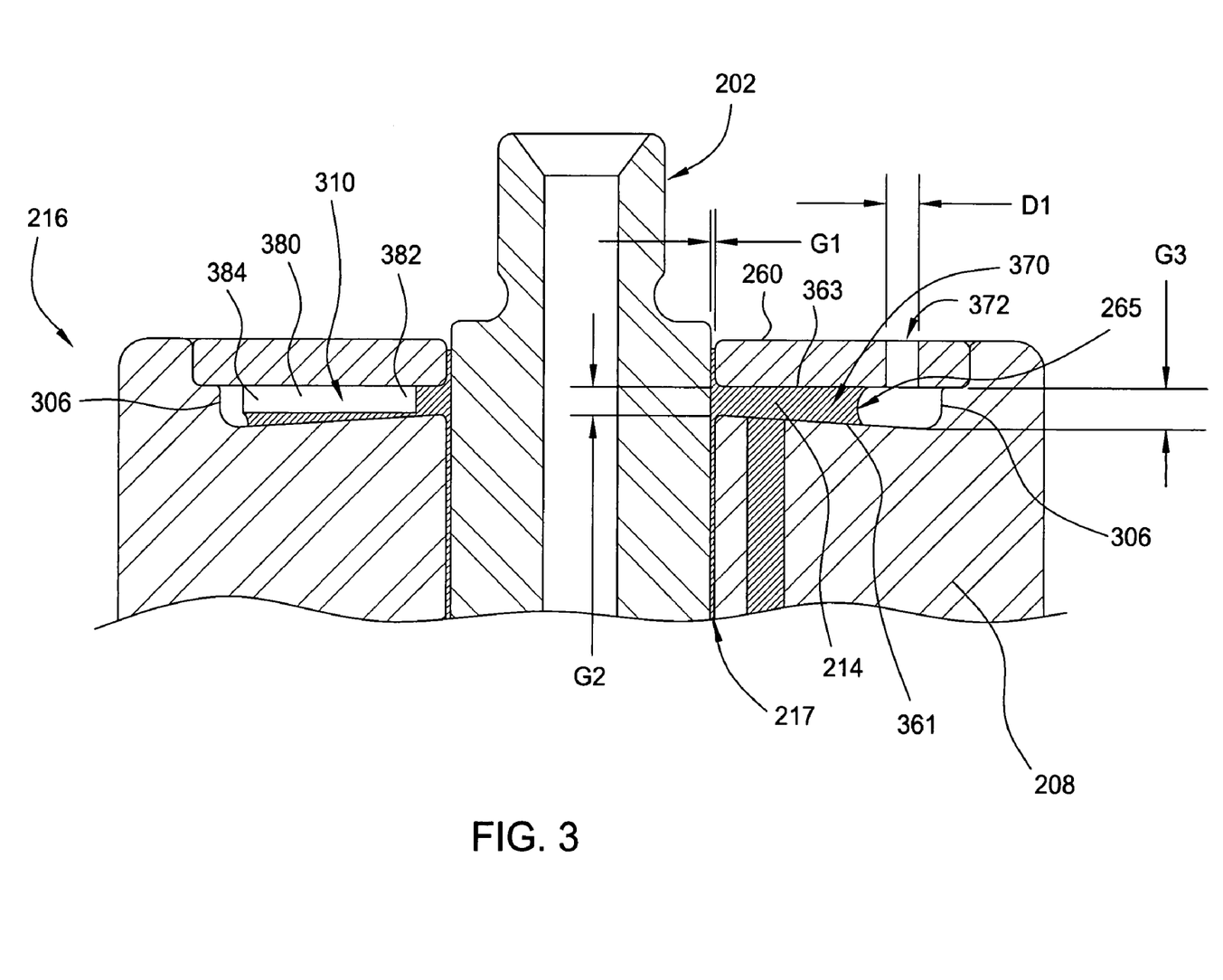
FIG. 3 depicts a cross section of the capillary seal depicted in FIG. 2.

FIG. 3 depicts a sectional view of one embodiment of the capillary seal 216. In this example, the capillary seal 216 is defined between a top surface 361 of the sleeve 208 and an opposing bottom surface 363 of a shield 260 coupled to the sleeve 208, forming a reservoir 370 for storing a volume of lubricating fluid 214. In general, an effective capillary seal has an adequate volume to act as a reservoir for replenishing fluid losses and is formed as a chamber defined between two diverging surfaces. At least one of the diverging surfaces is attached to or integral with one of the inner or outer members that establish the hydrodynamic bearing. In the example of FIG. 3, top surface 361 is defined on sleeve 208; sleeve 208 also defines the outer surface of hydro dynamic bearing 217. Also, the capillary seal is shown as radially oriented; it could as well be axial or other orientation as dictated by other design constraints; an example is described below in FIGS. 7A and 7B. The capillary seal 216 of this invention has energy dissipating characteristics that prevent the free flow of fluid under shock. The energy dissipating characteristics may be realized by the inclusion of at least one energy dissipating element generally referred to as texture within the seal and/or separating the fluid within the seal 216 into a plurality of flow control zones thereby preventing the loss or spillage of fluid disposed within the seal 216.

The top sleeve surface 361 is angled away from the bottom shield surface 363 to promote formation of a meniscus 265 across the end of the fluid 214 disposed in the reservoir 370. Alternatively, the shield surface 363 could be at an angle, or both surfaces 361, 363 could be at opposing shallow angles. The diverging surfaces 361, 363 of the sleeve 208 and the shield 260 typically retain the fluid 214 in the reservoir 370 by means of capillary action and surface tension, which causes the fluid 214 to be drawn toward the shaft 202 by capillary forces.

A first gap $G_1$ is defined between the shaft 202 and the shield 260, and establishes a very narrow capillary seal. A second gap $G_2$ represents the height of the seal 216 between the top surface 361 of the sleeve 208 at or near the entrance to the journal 217 and the opposing bottom surface 363 of the shield 260 at about that point. Gap $G_2$ generally defines the minimum width of the passageway which provides fluid communication between the capillary seal and the fluid bearing. Gap $G_1$ should be smaller than gap $G_2$ so that the capillary forces acting on the fluid 214 flowing into the capillary seal 216 normally direct the fluid into the journal 217. A third gap $G_3$ represents the width of the reservoir 370 defined by capillary seal 216 at its widest point. Gap $G_3$ may be smaller than the diameter $D_1$ of a vent/fill hole 372 in the seal 216, so that the fluid 214 in the vicinity of the vent/fill hole 372 is drawn away from the vent/fill hole 372 and into the reservoir 370.

Because of the presence of the fill hole 372 or similar access to the reservoir, one or more features are incorporated to restrict flow of the fluid, especially under shock to keep fluid from being lost through the fill hole. The features to be described below, under accelerating conditions caused by shock or the like, restrict fluid flow generally; the features may also be adapted to draw fluid toward safe zones, away from any opening or region not in communication with the bearing. The features may also be defined to shape the meniscus which defines the fluid/air boundary in the reservoir, so that the resistance to fluid displacement under deviation or shock is strengthened. By using the features for deviation or shaping of the meniscus, the fluid can be kept away from certain areas wherein fluid loss is more likely. Also the surface tension can be optimized along the meniscus, making fluid loss likely.

In one embodiment, the capillary seal 216 includes at least one energy absorbing member 310. The energy absorbing element 310 occupies a relatively small amount of the volume within the reservoir 370 in order to advantageously maximize the volume for holding the lubricating fluid 214 while still providing the benefit of leakage reduction.

In the embodiment depicted in FIG. 3, the energy absorbing member 310 is at least one flow restrictor 380 disposed in the reservoir 370. The flow restrictor 380 is adapted to the forces acting on the fluid 214 by dividing the fluid 214 in the reservoir 370 into separate fluid masses disposed in separate flow control zones (shown as 415 in FIG. 4) and/or by dissipating energy by providing a tortuous flow path within the seal 216 (discussed further below with respect to FIG. 5).

In one embodiment, the flow restrictor 380 extends radially from an inner end 382 disposed near the shaft 202 to an outer end 384 disposed near an outer edge 306 of the reservoir 370. The inner end 382 extends downward from the bottom surface 363 of the shield 260 toward the top surface 361 of the sleeve 208. The outer end 384 also extends downward from the bottom surface 363 of the shield 260, ending a short distance away from the top surface 361 of the sleeve 208. In one embodiment, the flow restrictor 380 is tapered from the inner end 382 to the outer end 384. Alternatively, the flow restrictors 380 could also have different geometries and be arranged in different patterns as well.

The flow restrictor 380 may be coupled to, or formed on, the bottom surface 363 of the shield 260, extending into the reservoir 370. Alternatively, the flow restrictor 380 may be coupled to the top surface 361 of the sleeve 208 or be an annular shape disposed in the capillary seal 216 without being coupled to either the sleeve 208 or the shield 260.

The flow restrictor 380 may be a solid material and may be a unitary component machined or stamped from a single piece of material, or may be manufactured and coupled to the shield 260 by any practicable means known in the art. In other embodiments, the flow restrictor 380 may be formed of a permeable or semi-permeable member or material, such as a screen, mesh, sponge, plastic, elastomer or the like, and may be either rigid or flexible. Generally speaking, the flow restrictor 380 may be made out of any material or combination of materials, and be of any size and arranged in any pattern which diminishes the energy of the fluid 214 moving laterally and/or rotationally relative to the motor axis, without substantially interfering with the performance of the motor 200. Thus, in the event that the motor 200 is subject to shock, the movement of the fluid within the seal 216 quickly loses energy as the fluid moves past the restrictors 380, thereby preventing the fluid from building enough pressure or lateral momentum to exit the fill holes 372 under shock conditions.

Figure 4:
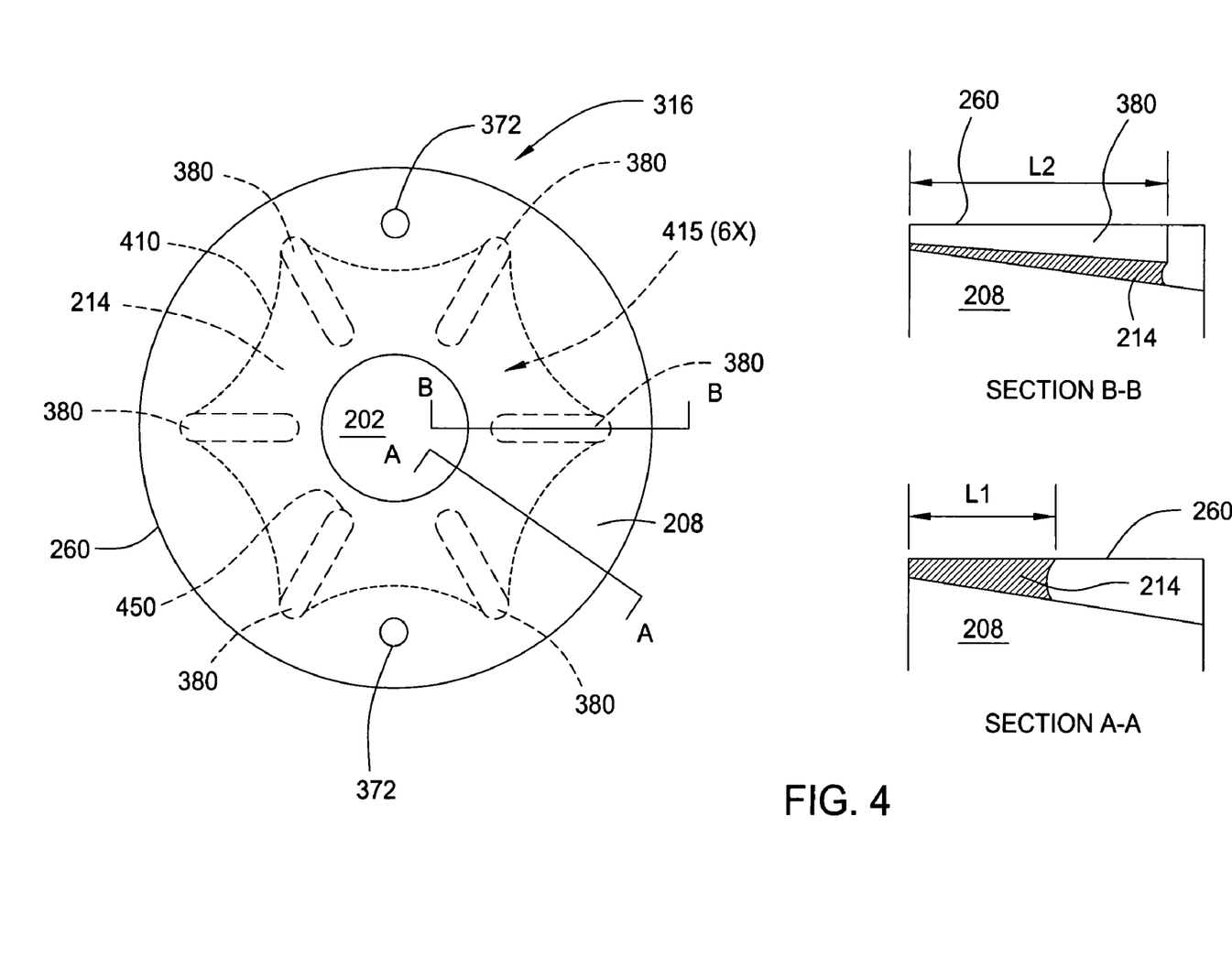
FIG. 4 depicts a plan and partial cross-sectional views of one embodiment of a capillary seal according to the present invention.

FIG. 4 depicts a top plan view of the capillary seal 216 as viewed through the shield 260, showing the location of the fluid 214 relative to the flow restrictors 380, and fill holes 372. In this embodiment, six flow restrictors 380 are arranged radially around the shaft 202 dividing the capillary seal 216 into six flow control zones 415. The capillary action and surface tension acting on the fluid 214 in the capillary seal 216 causes the fluid 214 to take a shape similar to that shown in the exemplary dashed line 410. Viewing the shape of the fluid 214 from a cross-section, it can be seen that the fluid 214 has a length L1 where there is no flow restrictor 380 (depicted in section A-A) and a longer length L2 beneath the flow restrictor 380 (depicted in section B-B). The shorter length L1 depicts the reduction in mass of the fluid 214 disposed between the flow restrictors 380. Thus, the flow restrictors 380 and the resultant shape 410 of the fluid 214 contained in the capillary seal 216 reduce the mass of fluid flow in any zone 415 of the capillary seal 216. This significantly reduces, the forces acting on the fluid 214 in any particular zone 415 when the motor 200 is exposed to an external force or shock. Moreover, flow control zones 415 have a degree of isolation from each other, thereby reducing the transfer of inertia, momentum and pressure between zones 415 and thereby advantageously reducing the potential for leakage of fluid 214 from the fill holes 372. The features such as restriction 310 preferably also cause a deviation in the shape of the meniscus found between the fluid 214 and the empty portion of the reservoir. This causes added surface tension along the fluid boundary, reducing the likelihood that fluid is lost under shock.

A further advantage is provided by the reduced fluid volume 214 in the region between feature 380 and reservoir surface 316 (depected at section B-B). Capillary forces created in this narrow region draw fluid displaced by acceleration back to safer or more desirable locations. In this embodiment the desired location 450 is in communication through gap G2 with the fluid bearing gap 217 between shaft 202 and sleeve 208.

Clearly the flow restrictors can be located and shaped in different arrays to break up the fluid mass, modify the meniscus shape and to draw the fluid to a desirable region. For example, the features may be configured as baffles to minimize fluid movement due to shocks in different axes; the features may be curved, spiral, dimpled, a maze-shaped pattern or the like. All the features described herein may be generally considered as creating a texture within the reservoir. The features may appear on both surfaces of the reservoir or be distributed through the reservoir volume as described with reference to FIG. 6.

Figure 5:
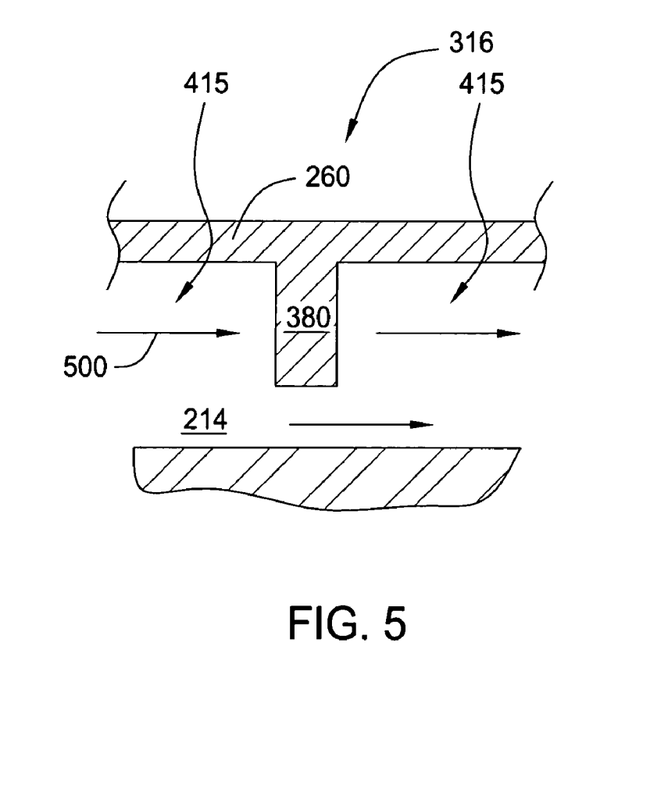
FIG. 5 depicts a partial cross-sectional view of one embodiment of a flow restrictor according to the present invention.

FIG. 5 illustrates a further advantage of the flow restrictors 380. Arrows 500 depict the flow of the fluid 214 contained in the capillary seal 216 when an external lateral shock is applied to the motor 200. The flow restrictors 380 create significant additional surface area which, in turn, increases the resistance to flow due to the viscosity of the fluid 214. This additional resistance to flow further absorbs the energy transferred to the fluid 214 flowing between zones 415 separated by the restrictor 380 during a shock event and thereby further reduces the potential for leakage of fluid 214 from the fill holes 372.

Figure 6:
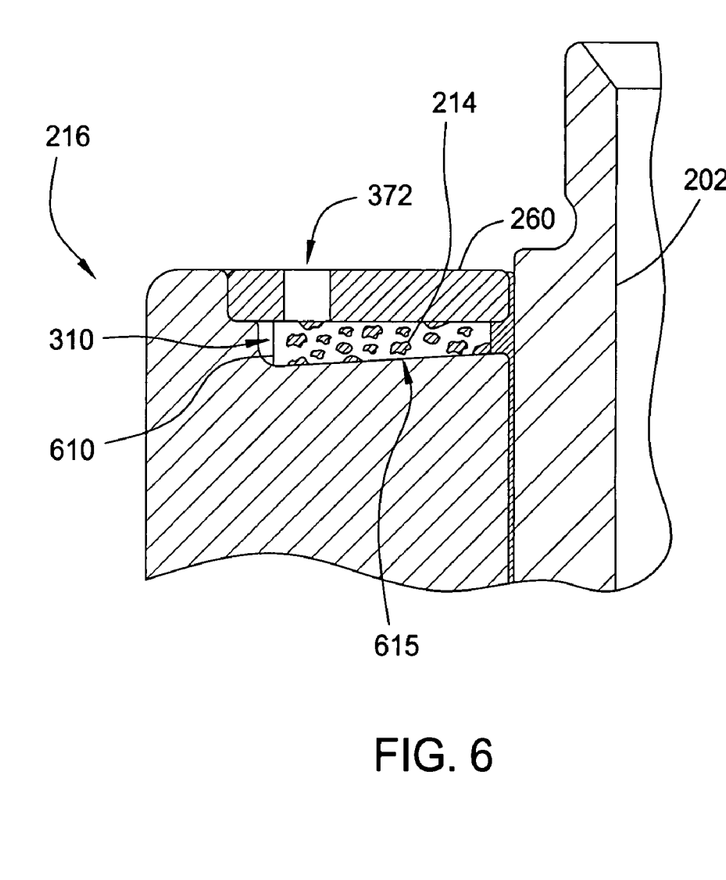
FIG. 6 depicts a partial cross-sectional view of another embodiment of a capillary seal according to the present invention.

FIG. 6 depicts a capillary seal 216 having another embodiment of an energy dissipating member or texture 310. In this embodiment, the energy dissipating member 310 is a permeable mass 610 disposed in the reservoir 370 of the capillary seal 216. The permeable mass 610 may be a single annular form, or may be comprised of a plurality of elements, coupled or loose, abutting or spaced. One embodiment, the permeable mass 610 may be a sponge, cellular material, or the like. Alternatively, the permeable mass 610 may be a plurality of particles, spheres, wadding, filings, shavings, or the like of material which advantageously creates a tortuous path for laterally moving fluid 214 within the seal 216 without substantially interfering with the performance of the motor 200. The tortuous fluid path through the permeable mass 610 prevents the fluid 214 from moving laterally with enough energy to leave the seal 216 and escape through the fill holes 372. Of course, when this mass is used, additional fluid is typically provided to account for the fluid trapped within the mass. Further, the mass could be localized within the reservoir, or be of variable density in different regions of the reservoir.

Figure 7A:
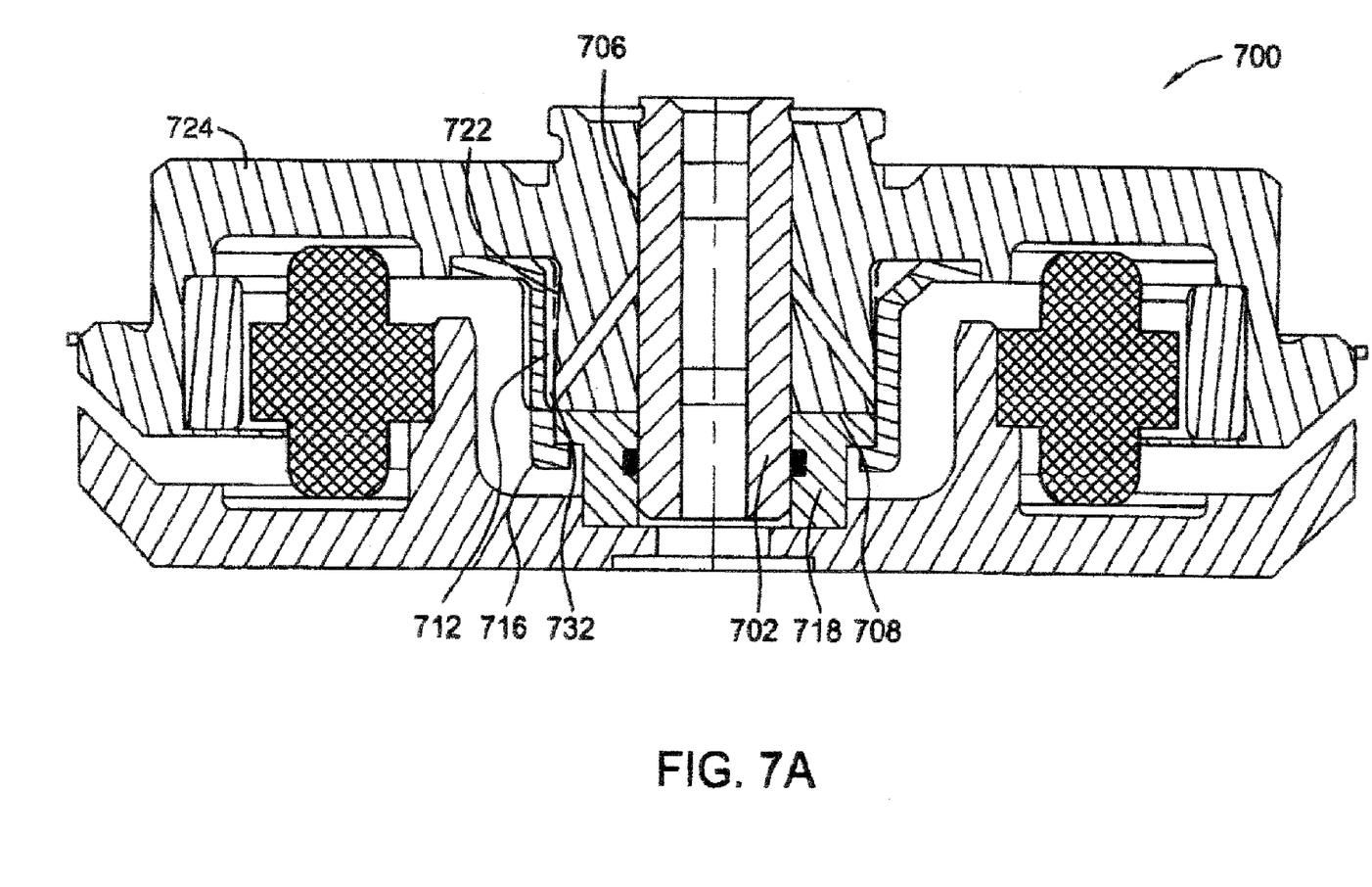
FIG. 7A is a sectional side view of a hydrodynamic bearing motor illustrating an axially oriented reservoir.

The permeable mass 610 may fill or nearly fill the reservoir 370, allowing fluid 214 to flow only through the interstitial cells 615 (flow paths) of the permeable mass 610 and thereby creating flow control zones and increasing the surface area in contact with the fluid 214. In one embodiment, the size of the interstitial cells 615 is large enough to maintain high volume of fluid 214 in the reservoir 370. The above description was given with respect to a radially oriented seal. The principle and features are equally applicable to an axially oriented seal such as appears in FIGS. 7A and 7B. FIG. 7A shows a motor 700 with a stationary shaft 702 and a hub and sleeve 724 supported for rotation by a journal bearing 706 and thrust bearing 708. Further details of this design can be found in U.S. application Ser. No. 10/632,449 filed Jul. 13, 2003 entitled Method and System for Withstanding Shock in a Spindle Motor Bearing, inventors, Le and Grantz assigned to the assignee of this invention and incorporated herein by reference.

The reservoir 712 is fluidly coupled through a plenum 732 to the journal bearing 706 and thrust bearing 708 and is defined between an inverted shield 716 supported from stationary thrust plate 718 and a surface 722 of rotating hub 724.

Figure 7B:
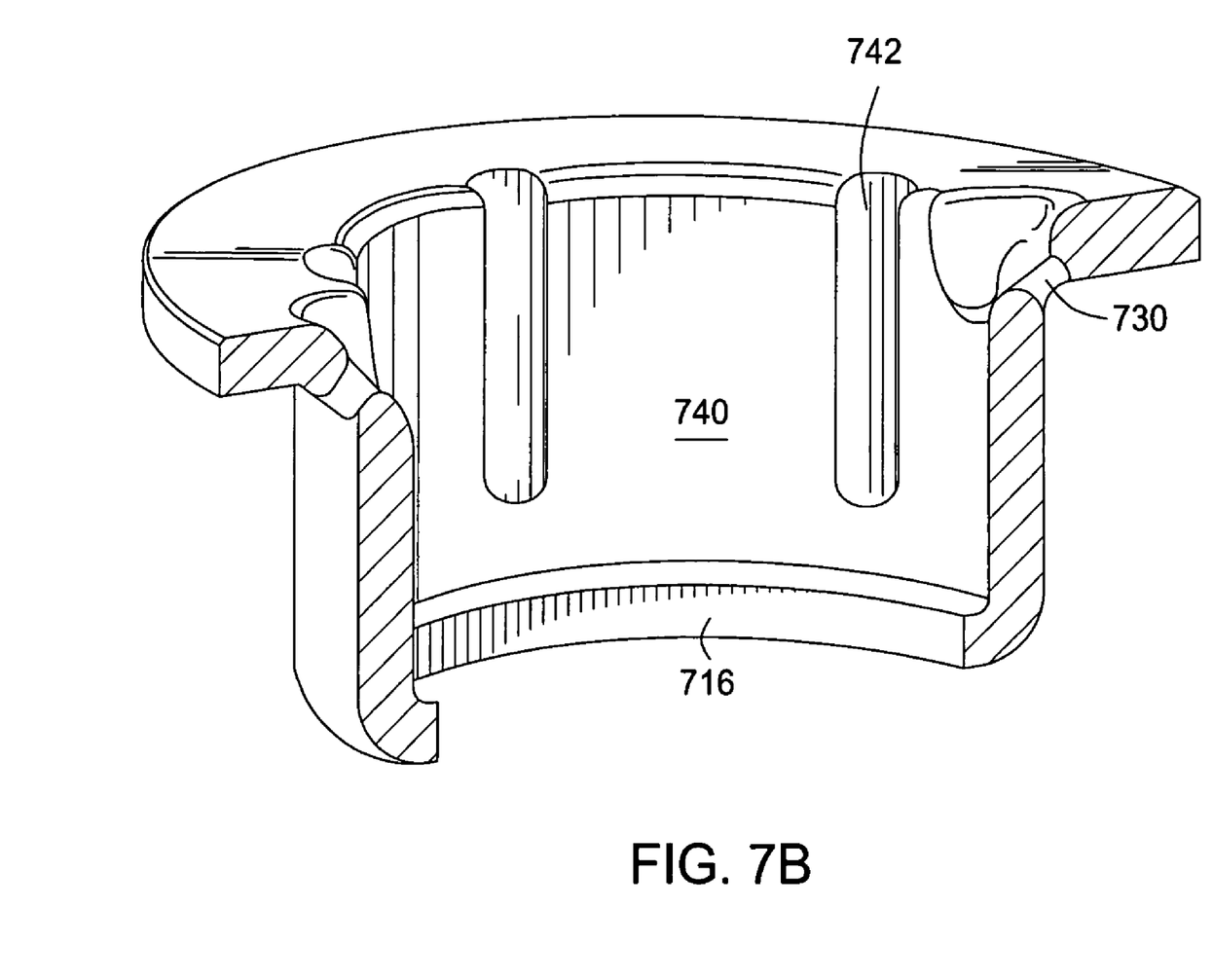
FIG. 7B is a perspective view of a shield used and in the motor of FIG. 7A to define the reservoir.

The shield 716 is shown in greater detail in FIG. 7B and includes a fill hole 730 at the end of the shield distal from the base. The connecting plenum 732 to the fluid bearing system is defined near the other end of the shield. When the motor 700 rests on its base, gravity maintains the fluid near the plenum 732 and away from fill hole 730; however, the motor may be used in other orientations. To maintain the fluid near the plenum, preferably very wide flow restrictors 740 are used, separated by narrow channels 742. These flow restrictors provide the capillary force to draw the fluid toward the plenum, especially in the event of shock, as well as shaping the meniscus to strengthened resistance to fluid movement. Obviously other shapes of flow restrictions may also be used as described above.

The features described above could be used in combination to reduce the likelihood of fluid loss under shock. For example, ribs could be used to draw fluid toward a safe zone or an inner diameter away from a fill hole, while a permeable mass is located under a fill hole.

Thus, a fluid dynamic bearing motor suitable for use in disk drive applications has been provided that includes a capillary seal with a texture incorporated in the reservoir. The capillary seal substantially prevents leakage of bearing lubricating fluid from the fluid dynamic bearing when the motor is subjected to shock conditions.

While the foregoing is directed to the illustrative embodiment of the present invention, other and further embodiments of the invention may be devised without departing from the basic scope thereof, and the scope thereof is determined by the claims that follow.

What is claimed is:

1. A capillary seal system for use in combination with a hydrodynamic bearing and comprising:
    an inner member positioned within an outer member, with at least one grooved hydrodynamic bearing and a lubricating fluid located in a gap defined by the inner member and the outer member to support relative rotation,
    a capillary seal in fluid communication with the hydrodynamic bearing and formed as a reservoir defined between two diverging surfaces for holding the lubricating fluid for replenishing fluid losses in the bearing,
    at least one of said diverging surfaces attached to or integral with at least one of the inner or outer members, an end of the fluid reservoir toward which the two surfaces generally converge being in fluid communication with hydrodynamic bearing gap through at least one passageway, and
    an energy dissipating element in the reservoir defined between the two diverging surfaces for preventing fluid spillage from the reservoir when subjected to shock acceleration.

2. A capillary seal system as claimed in claim 1 wherein the energy dissipating element results in a shaping of a meniscus of the fluid to strengthen resistance of the fluid to displacement under shock.

3. A capillary seal system as claimed in claim 1 wherein the texture comprises means for establishing capillary forces in the reservoir for drawing the fluid to a location in the reservoir in communication through the passageway with the bearing gap.

4. A capillary seal system as claimed in claim 1 wherein the energy dissipating element comprises at least one flow restricting feature in the reservoir to resist fluid flow in the reservoir under shock.

5. A capillary seal system as claimed in claim 4 wherein the flow restricting feature comprises a baffle selected from the group consisting of a spiral, curve, or a maze.

6. A capillary seal system as claimed in claim 4 wherein the restricting feature comprises a permeable mass occupying at least a portion of the reservoir.

7. A capillary seal system as claimed in claim 6 wherein the permeable mass is a sponge or cellular material.

8. A capillary seal system as claimed in claim 6 wherein the permeable mass comprised means for creating a tortuous path for moving fluid.

9. A capillary seal system as claimed in claim 6 wherein the permeable mass is located in a region of likely fluid loss, and further comprising one or more—means for establishing capillary forces to move the fluid toward the passageway to the hydrodynamic bearing.

10. A capillary seal system as claimed in claim 9 wherein the means for establishing capillary forces comprises one or more ribs or baffles extending toward the passageway to the hydrodynamic bearing.

11. A capillary seal system as claimed in claim 10 wherein the ribs are substantially wider than the channels.

12. A capillary seal system as claimed in claim 4 wherein the feature comprises at least one rib positioned to reduces the gap between surfaces in the reservoir and cause fluid to flow to a location in the reservoir the passageway to the bearing gap.

13. A capillary seal system as claimed in claim 12 comprises a plurality of ribs separated by grooves, one or more of the ribs extending wherein the feature to the location near the passageway to the bearing gap.

14. A capillary seal system as claimed in claim 13 wherein the ribs are wider than the grooves.

15. A capillary seal system as claimed in claim 4 wherein the reservoir includes an opening for adding fluid to the reservoir and the feature defines a meniscus between the fluid and a region of the reservoir adjoining the opening.

16. A capillary seal system as claimed in claim 15 wherein the feature includes at least one rib having an end positioned to define the meniscus of the fluid.

17. A capillary seal system for use in combination with a hydrodynamic bearing and comprising:

an inner member positioned within an outer member, with at least one grooved hydrodynamic bearing and a lubricating fluid located in a gap defined by the inner and the outer member to support relative rotation, a capillary seal in fluid communication with the hydrodynamic bearing and formed as a reservoir defined between two diverging surfaces for holding the lubricating fluid for replenishing fluid losses in the bearing, at least one of said diverging surfaces attached to or integral with at least one of the inner or outer members, an end of the fluid reservoir toward which the two surfaces generally converge being in fluid communication with hydrodynamic bearing gap through at least one passageway, and a texture in the reservoir defined between the two diverging surfaces for preventing fluid spillage from the reservoir when subjected to shock acceleration;

wherein the texture results in a shaping of a meniscus of the fluid to strengthen resistance of the fluid to displacement under shock; and wherein the texture comprises at least one rib in the reservoir to resist fluid flow within the reservoir under shock.

18. A capillary seal system for use in combination with a hydrodynamic bearing and comprising:

an inner member positioned within an outer member, with at least one grooved hydrodynamic bearing and a lubricating fluid located in a gap defined by the inner and the outer member to support relative rotation, a capillary seal in fluid communication with the hydrodynamic bearing and formed as a reservoir defined between two diverging surfaces for holding the lubricating fluid for replenishing fluid losses in the bearing, at least one of said diverging surfaces attached to or integral with at least one of the inner or outer members, an end of the fluid reservoir toward which the two surfaces generally converge being in fluid communication with hydrodynamic bearing gap through at least one passageway, and a texture in the reservoir defined between the two diverging surfaces for preventing fluid spillage from the reservoir when subjected to shock acceleration;

wherein the texture results in a shaping of a meniscus of the fluid to strengthen resistance of the fluid to displacement under shock; and wherein the texture comprises a plurality of ribs in the reservoir separated by channels, the ribs shaping the meniscus between the fluid and a region of reservoir wherein fluid could be lost under shock.

19. A capillary seal system for use in combination with a hydrodynamic bearing and comprising:

an inner member positioned within an outer member, with at least one grooved hydrodynamic bearing and a lubricating fluid located in a gap defined by the inner and the outer member to support relative rotation, a capillary seal in fluid communication with the hydrodynamic bearing and formed as a reservoir defined between two diverging surfaces for holding the lubricating fluid for replenishing fluid losses in the bearing, at least one of said diverging surfaces attached to or integral with at least one of the inner or outer members, an end of the fluid reservoir toward which the two surfaces generally converge being in fluid communication with hydrodynamic bearing gap through at least one passageway, and a texture in the reservoir defined between the two diverging surfaces for preventing fluid spillage from the reservoir when subjected to shock acceleration;

wherein the texture comprises at least one flow restricting feature in the reservoir to resist fluid flow in the reservoir under shock; and including a plurality of ribs separated by channels to resist fluid flow.

20. A capillary seal system as claimed in claim 19 wherein the ribs are substantially wider than the channels.

21. A capillary seal system for use in combination with a hydrodynamic bearing, the capillary seal system comprising:

an inner member positioned within an outer member, with at least one grooved hydrodynamic bearing and a lubricating fluid located in a hydrodynamic bearing gap defined by the inner member and the outer member to support relative rotation;

a capillary seal in fluid communication with the hydrodynamic bearing and formed as a reservoir defined between first and second surfaces and holding the lubricating fluid which replenishes fluid losses in the bearing, wherein at least one of the first and second surfaces is attached to, or integral with, at least one of the inner or outer members, an end of the fluid reservoir being in fluid communication with the hydrodynamic bearing gap through at least one passageway; and an energy dissipating element in the reservoir which prevents fluid spillage from the reservoir when subjected to mechanical shock and, at least in part, shapes at least one meniscus of the lubricating fluid.

22. A capillary seal system as in claim 21 wherein the first and second surfaces are approximately parallel to each other.

23. A capillary seal system as in claim 21 wherein the energy dissipating element is included in a plurality of energy dissipating elements in the reservoir such that each of the plurality of energy dissipating elements shapes, at least in part, at least one of a plurality of meniscuses of the lubricating fluid.

24. A capillary seal system as in claim 23 wherein the plurality of energy dissipating elements is included in a multiplicity of energy dissipating elements and each of the multiplicity of energy dissipating elements shapes, at least in part, at least one of a multiplicity meniscuses of the lubricating fluid.

25. A capillary seal system as in claim 24 wherein said each of the multiplicity of energy dissipating elements is a rib.

26. A capillary seal system as in claim 25 wherein the rib is integral with the first surface.

27. A capillary seal system as in claim 25 wherein the rib forms a gap with the second surface.

* * * * *